(12) United States Patent
Marupaduga et al.

(10) Patent No.: US 9,813,141 B1
(45) Date of Patent: Nov. 7, 2017

(54) DYNAMIC CONTROL OF AUTOMATIC GAIN CONTROL (AGC) IN A REPEATER SYSTEM

(71) Applicant: Sprint Communications Company L.P., Overland Park, KS (US)

(72) Inventors: Sreekar Marupaduga, Overland Park, KS (US); Andrew Mark Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/223,963

(22) Filed: Jul. 29, 2016

(51) Int. Cl.
*H04W 4/00* (2009.01)
*H04B 7/155* (2006.01)
*H04W 28/02* (2009.01)

(52) U.S. Cl.
CPC .... *H04B 7/15535* (2013.01); *H04W 28/0268* (2013.01)

(58) Field of Classification Search
CPC ........... H04B 7/15535; H04B 7/15578; H04W 28/0268; H04W 88/08; H04W 16/14; H04W 52/346; H04W 52/241; H03G 3/3078; H04L 2012/5679; H04L 27/2647; H04L 5/00; H04L 47/10; H04L 47/2441
USPC ............. 455/422.1, 450, 561; 370/315, 328; 375/211
See application file for complete search history.

(56) References Cited

U.S. PATENT DOCUMENTS

| 5,604,730 | A  | * | 2/1997  | Tiedemann, Jr. ... | H04W 52/146 370/252 |
| 6,654,377 | B1 | * | 11/2003 | Pasternak ........... | H04L 12/5601 370/329 |
| 6,795,407 | B2 | * | 9/2004  | Chesson ............. | H04W 52/346 370/311 |
| 7,016,688 | B2 | * | 3/2006  | Simic ................... | G01S 5/0226 342/387 |
| 7,227,916 | B2 | * | 6/2007  | Ruelke ................. | H03G 3/001 375/324 |

(Continued)

FOREIGN PATENT DOCUMENTS

| CN | 102625435 B | * | 11/2014 | |
| EP | 1124356 A2 | * | 8/2001 | ............. H04L 47/10 |

(Continued)

*Primary Examiner* — Mahendra Patel (57) ABSTRACT

A Long Term Evolution (LTE) communication system dynamically controls Automatic Gain Control (AGC) in a repeater system serving individual User Equipment (UE). The LTE communication system identifies individual UEs and an application type used by the individual UEs being served by a repeater section in the repeater system. The LTE communication system determines a Variable Bit Rate (VBR)-to-Guaranteed Bit Rate (GBR) application ratio based on a number of the identified individual UEs using a VBR application and a number of the identified individual UEs using a GBR application. The LTE communication system compares the VBR-to-GBR application ratio to a VBR application threshold and determines that the VBR-to-GBR application ratio exceeds the VBR application threshold. In response to determining that the VBR-to-GBR application ratio exceeds the VBR application threshold, the LTE communication system instructs the repeater section in the repeater system to disable the AGC.

12 Claims, 8 Drawing Sheets

(56) References Cited

U.S. PATENT DOCUMENTS

| | | |
|---|---|---|
| 8,306,134 B2 | 11/2012 | Martens et al. |
| 8,831,431 B2 * | 9/2014 | Ou .................... H04B 10/40 398/135 |
| 2001/0048727 A1 | 12/2001 | Schmutz et al. |
| 2003/0219085 A1 * | 11/2003 | Endres ................ H03G 3/3052 375/350 |
| 2008/0056130 A1 * | 3/2008 | Desai ................. H04L 12/2801 370/231 |
| 2008/0209494 A1 * | 8/2008 | Dravida ............. H04L 12/2801 725/129 |
| 2008/0273636 A1 * | 11/2008 | Zhu .................... H03G 3/3078 375/345 |
| 2008/0293360 A1 * | 11/2008 | Maslennikov ..... H04B 7/15578 455/24 |
| 2010/0189188 A1 | 7/2010 | Li et al. |
| 2010/0285737 A1 | 11/2010 | Gore et al. |
| 2010/0285740 A1 | 11/2010 | Wang et al. |
| 2010/0316092 A1 * | 12/2010 | Hannan ............. H04B 7/15535 375/142 |
| 2011/0170495 A1 * | 7/2011 | Earnshaw ............ H04W 72/02 370/329 |
| 2014/0018059 A1 * | 1/2014 | Noonan ................ H04W 48/04 455/419 |
| 2015/0303960 A1 | 10/2015 | Ferrante et al. |
| 2016/0164647 A1 * | 6/2016 | Agee .................... H04B 7/0413 375/267 |
| 2016/0197409 A1 * | 7/2016 | Henry ............. H04B 10/25753 375/256 |

FOREIGN PATENT DOCUMENTS

| | | | | |
|---|---|---|---|---|
| EP | 1139581 A2 | * | 10/2001 | ......... H04W 52/146 |
| EP | 1139581 B1 | * | 10/2004 | ......... H04W 52/146 |
| WO | WO 9921313 B1 | * | 9/1999 | ......... H04L 12/5601 |
| WO | WO 0163849 A3 | * | 8/2002 | ......... H04L 11/1803 |

* cited by examiner

DYNAMIC CONTROL OF AUTOMATIC GAIN CONTROL (AGC) IN A REPEATER SYSTEM

TECHNICAL BACKGROUND

Wireless communication systems transfer data packets between User Equipment (UE) to provide data communication services, like internet access, media streaming, and user messaging. Wireless communication systems allow users to move about and communicate over the air with access communication. Communication services include voice calls, data exchange, web pages, streaming media, or text messages, among other communication services.

To expand or enhance the wireless signal coverage of a wireless communication network, such as in a Long Term Evolution (LTE) communication system, repeaters may be added to locations not adequately covered by current network infrastructure. A repeater transmits and receives wireless signals exchanged between wireless devices and a wireless network access point. Without the signal repetition provided by the wireless repeater, the coverage area of the wireless network access point may otherwise have not extended far enough to serve the wireless devices using the repeater. Thus, a wireless repeater provides a less resource intensive means for increasing wireless network coverage.

Repeater systems typically use Automatic Gain Control (AGC) to maintain a constant signal at the demodulator, independent of attenuation between a transmitter and receiver. However, constant AGC may hinder throughput speeds experienced by end users from the repeater systems. While AGC may enhance a quality of service for some applications, such as voice applications, AGC can negatively impact the quality-of service for other applications, such as data streaming applications.

While the use of AGC in repeaters may provide an effective method of enabling a system to provide control of signal amplitude despite variation in the input signal, it may become difficult for the repeater system to manage the allocation of wireless resources and data throughput to end users using data applications. Unfortunately, there is no efficient and effective way of dynamically control AGC in a repeater system serving end users using various application types.

TECHNICAL OVERVIEW

A Long Term Evolution (LTE) communication system dynamically controls Automatic Gain Control (AGC) in a repeater system serving individual User Equipment (UE). The LTE communication system identifies individual UEs and an application type used by the individual UEs being served by a repeater section in the repeater system. The LTE communication system determines a Variable Bit Rate (VBR)-to-Guaranteed Bit Rate (GBR) application ratio based on a number of the identified individual UEs using a VBR application and a number of the identified individual UEs using a GBR application. The LTE communication system compares the VBR-to-GBR application ratio to a VBR application threshold and determines that the VBR-to-GBR application ratio exceeds the VBR application threshold. In response to determining that the VBR-to-GBR application ratio exceeds the VBR application threshold, the LTE communication system instructs the repeater section in the repeater system to disable the AGC.

DETAILED DESCRIPTION

Figure 1:
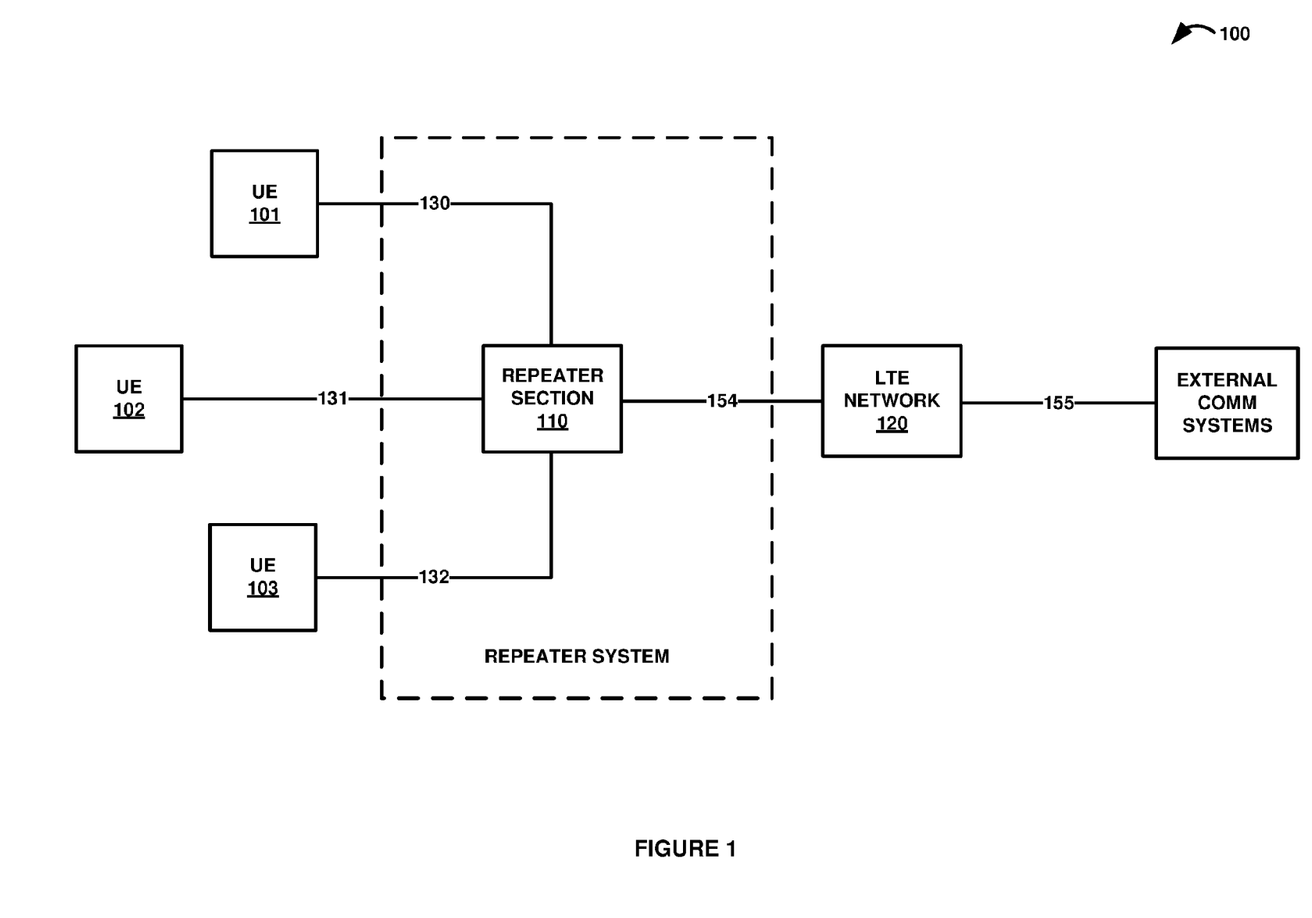
FIGS. 1-3 illustrate a Long Term Evolution (LTE) communication system to dynamically control Automatic Gain Control (AGC) in a repeater system serving individual User Equipment (UE).
Figure 2:
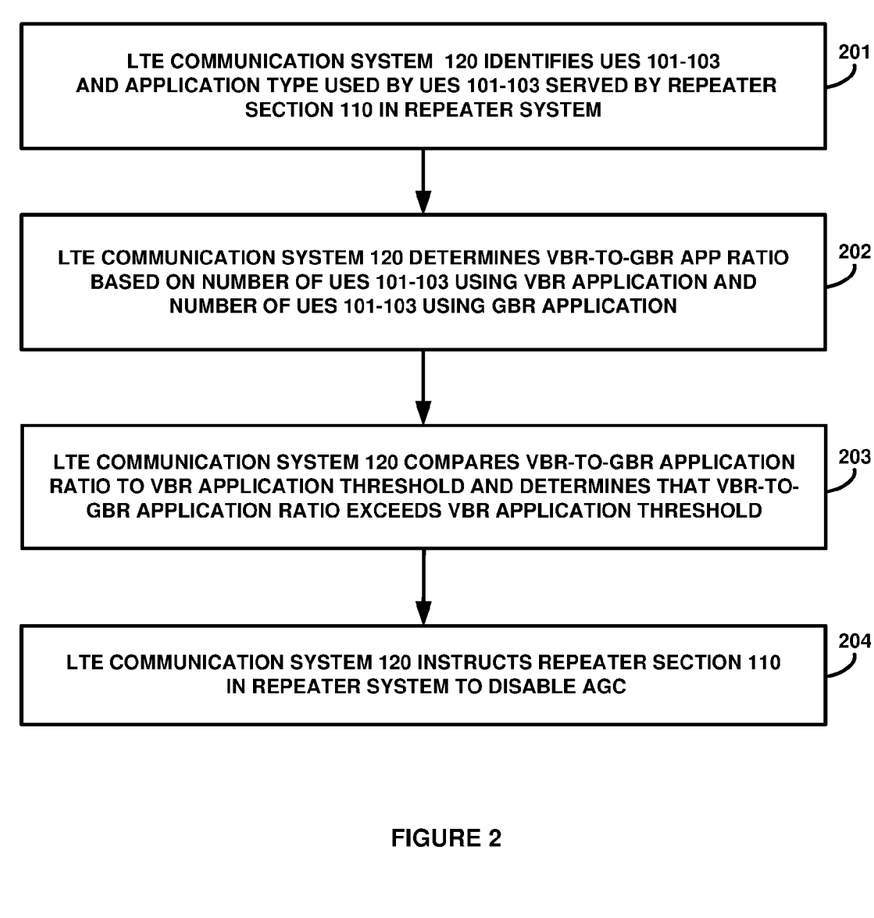
Figure 3:
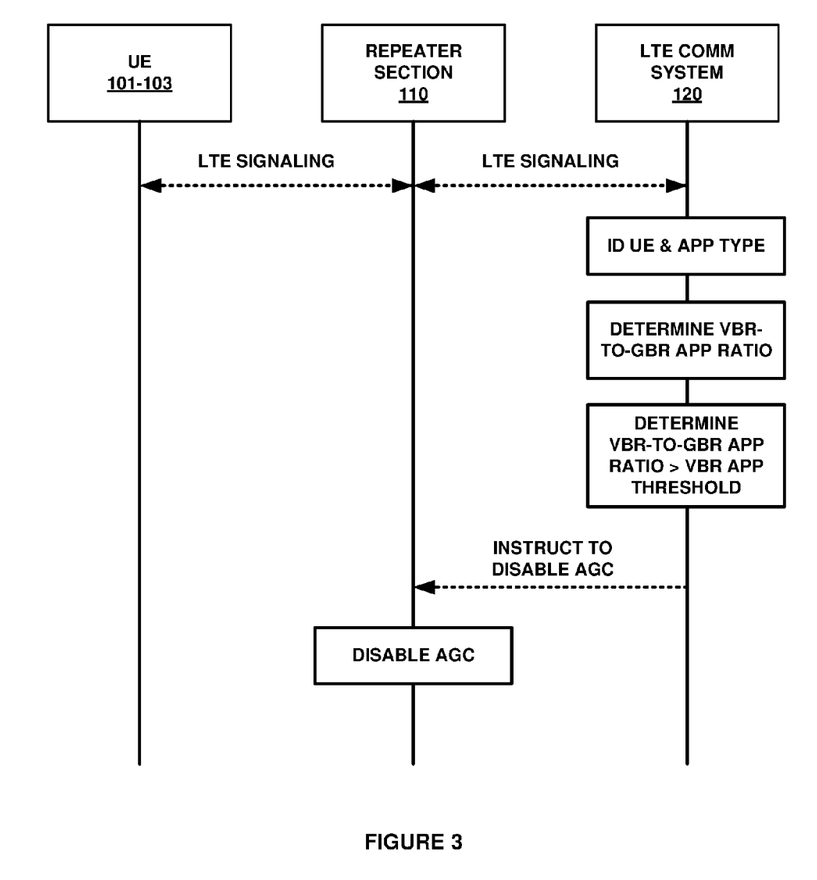

FIGS. 1-3 illustrate communication system 100 to dynamically control Automatic Gain Control (AGC) in a repeater system serving individual User Equipment (UE). Referring to FIG. 1, communication system 100 comprises UEs 101-103, repeater section 110, Long Term Evolution (LTE) communication system 120, and external communication systems. UEs 101-103 communicate with repeater section 110 over signaling links 130-132. Repeater section 110 communicates with LTE communication system 120 over communication link 133. LTE communication system 120 communications with external communication systems over 134.

In operation, LTE communication system 120 identifies UEs 101-103 and an application type used by UEs 101-103 being served by repeater section 110 in the repeater system. Repeater section 110 provides wireless communication services to applications and processes running on UEs 101-103. To provide services, repeater section 110 communicates with LTE communication system 120. In particular, repeater section 110 may attach to LTE communication system 120 by transferring an attach request message, and in response to the request, LTE communication system 120 may provide wireless resources to repeater section 110 in the repeater system over communication link 133.

UEs 101-103 may then attach to and register with repeater section 110 which permits repeater section 110 to provide wireless signaling from LTE communication system 120 to UEs 101-103. It should be noted that repeater section 110 may be part of a hop of repeaters. LTE communication system 120 may provide signaling and data to UEs 101-103 by establishing bearers to each of UEs 101-103 over repeater section 110. LTE communication system 120 may identify UEs 101-103 based on the location of UEs 101-103 in repeater section 110 of the repeater system. LTE communication system 120 may also identify UEs 101-103 based on registration information stored in LTE communication system 120. In other examples, LTE communication system 120 may identify UEs 101-103 based on bearer establishment between LTE communication system 120 and UEs 101-103 over repeater section 110, such as a Quality-of-Service (QoS) Class Identifier (QCI).

LTE communication system 120 may identify the application type used by UEs 101-103 based on the type of QCIs used by UEs 101-103. Various QCIs may require different performance characteristics, such as a bitrate, priority value, packet delay budget, packet error loss rate, and the like. A bitrate may be used to measure an amount of data transferred or processed over a unit time period. A Variable Bitrate (VBR) varies the amount of data transferred or processed over time which allows complex segments of media files to be allocated a higher bitrate while less complex segments are allocated a lower bitrate. A Guaranteed Bitrate (GBR) guarantees that a bandwidth required for the performance of the specific QCI will be provided. LTE communication system 120 may identify the application type used by UEs 101-103 based on the application requiring a VBR QCI or a GBR QCI.

It should be noted that an individual UE may use multiple QCIs to support various application types simultaneously. LTE communication system 120 may therefore identify an application type used by UEs 101-103 based on a dominant application type, such as UEs 101-103 using at least one application requiring a GBR QCI or UEs 101-103 using at least one application requiring a VBR QCI. In some examples, LTE communication system 120 may identify a total number of QCIs used by each of UEs 101-103 and identify an application type based on an application type having a greater number of QCIs established for the particular UE. In some examples, the multiple application types may be identified for each of UEs 101-103 based on the one or more QCI being used by UEs 101-103. However, other methods of determining an application type for UEs 101-103 are available.

In a next operation, LTE communication system 120 determines a VBR-to-GBR application ratio based on a number of UEs 101-103 using a VBR application and a number of UEs 101-103 using a GBR application. LTE communication system 120 may determine a number of UEs 101-103 using a GBR application by determining that UEs 101-103 are using a QCI 1 for conversational voice calls, a QCI 2 for conversational video conferencing, a QCI 3 for real time gaming, a QCI 4 for non-conversational video, a QCI 65 for mission critical user plane push to talk voice calls, a QCI 66 for non-mission critical user plane push to talk voice calls, or some other GBR QCI. LTE communication system 120 may determine a number of UEs 101-103 using VBR applications by determining a number of UEs 101-103 using a QCI 6, a QCI 7, and QCI 8 for live and buffered streaming type applications, such as voice streaming, interactive gaming, video on demand, Web browsing, and Telnet, a QCI 9 for background internet type applications, such as email, or some other VBR QCI.

LTE communication system compares the VBR-to-GBR application ratio to a VBR application threshold and determines that the VBR-to-GBR application ratio exceeds the VBR application threshold. The VBR application threshold may be determined by LTE communication system 120 based on repeater section 110 performance characteristics stored in a database or look-up table in LTE communication system 120. The VBR application threshold may also be received from an external element, such as repeater section 110. In some examples, the VBR application threshold may contain a buffer range in which the VBR application threshold is only exceeded if the VBR-to-GBR application ratio exceeds an upper limit of the buffer range. Conversely, in examples where AGC may be enabled, the VBR-to-GBR application ratio may be determined to not be exceed if a lower limit of the buffer range is not exceeded. Advantageously, this prevents the AGC from being turned on and off too frequently when that VBR-to-GBR application ratio is hovering around the VBR application threshold.

LTE communication system 120 instructs repeater section 110 in the repeater system to disable the AGC. AGC is used to maintain a constant signal at the demodulator, independent of attenuation between a transmitter and receiver. AGC may enhance a quality of service for some applications, such as GBR applications for voice calls. However, AGC can negatively impact the throughput speeds for other applications, such as VBR applications for data streaming. In some examples, LTE communication system 120 may instruct repeater section 110 in repeater system to disable the AGC by sending an instruction message to repeater section 110 over an X2 interface.

In some examples, LTE communication system 120 may determine that the VBR-to-GBR application ratio does not exceed the VBR application threshold. In this example, LTE communication system 120 may instruct repeater section 110 in the repeater system to disable the AGC. LTE communication system 120 may set a timer to for AGC disablement and re-evaluate the VBR-to-GBR application ratio when a timer expires. LTE communication system 120 may also re-evaluate the VBR-to-GBR application ratio when a number of UEs 101-103 attach and register with LTE communication system 120 over repeater system 110 after the AGC disablement for repeater system 110. In other examples, repeater system 110 may enable AGC independent of instructions from LTE communication system 120.

It should be noted that although FIG. 1 shows LTE communication system 120 exchanging signaling and data with repeater section 110 over direct links, LTE communication system 120 may also exchange signaling and data with repeater section 110 over additional communication links and network elements, such as other repeater sections or repeater hops, an evolved NodeB (eNodeB), a Serving Gateway (S-GW), a Packet Data Network Gateway (P-GW), a Mobility Management Entity (MME), and other communication network elements—including combinations thereof.

FIG. 2 is a flow diagram illustrating an operation of communication system 100 to dynamically control AGC in a repeater system serving individual UEs. LTE communication system 120 identifies (201) UEs 101-103 and an application type used by UEs 101-103 being served by repeater section 110 in the repeater system. LTE communication system 120 determines (202) a VBR-to-GBR application ratio based on a number of UEs 101-103 using a VBR application and a number of UEs 101-103 using a GBR application. LTE communication system 120 (203) compares the VBR-to-GBR application ratio to a VBR application threshold and determines (203) that the VBR-to-GBR application ratio exceeds the VBR application threshold. LTE communication system 120 instructs (204) repeater section 110 in the repeater system to disable the AGC.

FIG. 3 is a sequence diagram illustrating the operation of communication system 100 to dynamically control AGC in a repeater system serving individual UE. In a first operation, LTE communication system 120 identifies UEs 101-103 and an application type used by each of UEs 101-103. For example, LTE communication system 120 may identify UEs 101-103 being served by repeater section 110 in the repeater system based on QCI 5 established over repeater section 110 since each of UEs 101-103 would typically establish a QCI 5 for Internet Protocol (IP) Multimedia System (IMS) signaling with LTE communication system 120 over repeater section 110 after attaching to and registering with LTE communication system 120.

LTE communication system 120 may then determine an application type for each of the identified UEs 101-103 based on additional QCIs established for UEs 101-103 over repeater section 110. For example, LTE communication system 120 may determine that additional QCIs that include a QCI 1, a QCI 2, a QCI 3, and a QCI 4 are associated with a GBR application type. LTE communication system 120 may further determine that additional QCIs that include a QCI 6, a QCI 7, a QCI 8, and a QCI 9 are associated with a VBR.

It should be noted that in another example LTE communication system 120 may determine that UEs 101-103 use multiple QCIs. In this example, LTE communication system 120 may determine that if UEs 101-103 are using at least one of a QCI 1, a QCI 2, a QCI 3, or a QCI 4, the application type associated with UEs 101-103 is a GBR application type. LTE communication system 120 may then determine that if UEs 101-103 have not established a QCI 1, a QCI 2, a QCI 3, or a QCI 4, then the application type associated with UEs 101-103 is a VBR application type. However, other examples of determining an application type for UEs 101-103 using multiple QCIs are available.

LTE communication system 120 determines a VBR-to-GBR application ratio based on a number of identified UEs 101-103 using a VBR application and a number of identified UEs 101-103 using a GBR application. For example, LTE communication system 120 may determine that there are five identified UEs 101-103 that have established a QCI 1 for conversational voice call over repeater section 110 and twenty identified UEs 101-103 that have established a QCI 6 for data streaming over repeater section 110. LTE communication system 120 may then determine VBR-to-GRB application ratio of 25% based on the number of UEs 101-103 that have established the QCI 6s and the number of UEs 101-103 that have established the QCI 1s.

In a next operation, LTE communication system 120 compares the VBR-to-GBR application threshold to a VBR application threshold and determines that the VBR-to-GBR application ratio exceeds the VBR application threshold. For example, LTE communication system 120 may query a database to determine that the VBR application threshold associated with repeater section 110 is 20%. In this example, the VBR-to-GBR application threshold of 25% exceeds the VBR application threshold of 20% and therefore, LTE communication system 120 may determine that the AGC for repeater section 110 should be disabled.

In response to determining that the VBR-to-GBR application ratio exceeds the VBR application threshold, LTE communication system 120 instructs repeater section 110 to disable the AGC. For example, in response to determining that a VBR-to-GBR application ratio of 25% exceeds the VBR application threshold of 20%, LTE communication system 120 may transfer an X2 interface message to repeater section 110 instructing repeater section 110 to disable the AGC. Repeater section 110 would then disable the AGC for future communications with UEs 101-103 until given an X2 interface message from LTE communication system 120 instructing repeater section 110 to enable the AGC. In this example, LTE communication system 120 may set a timer and re-evaluate the VBR-to-GBR application ratio after the timer expires. However, other methods for determining to re-initiate the process or enable AGC for repeater section 110 in the repeater system are available.

Figure 4:
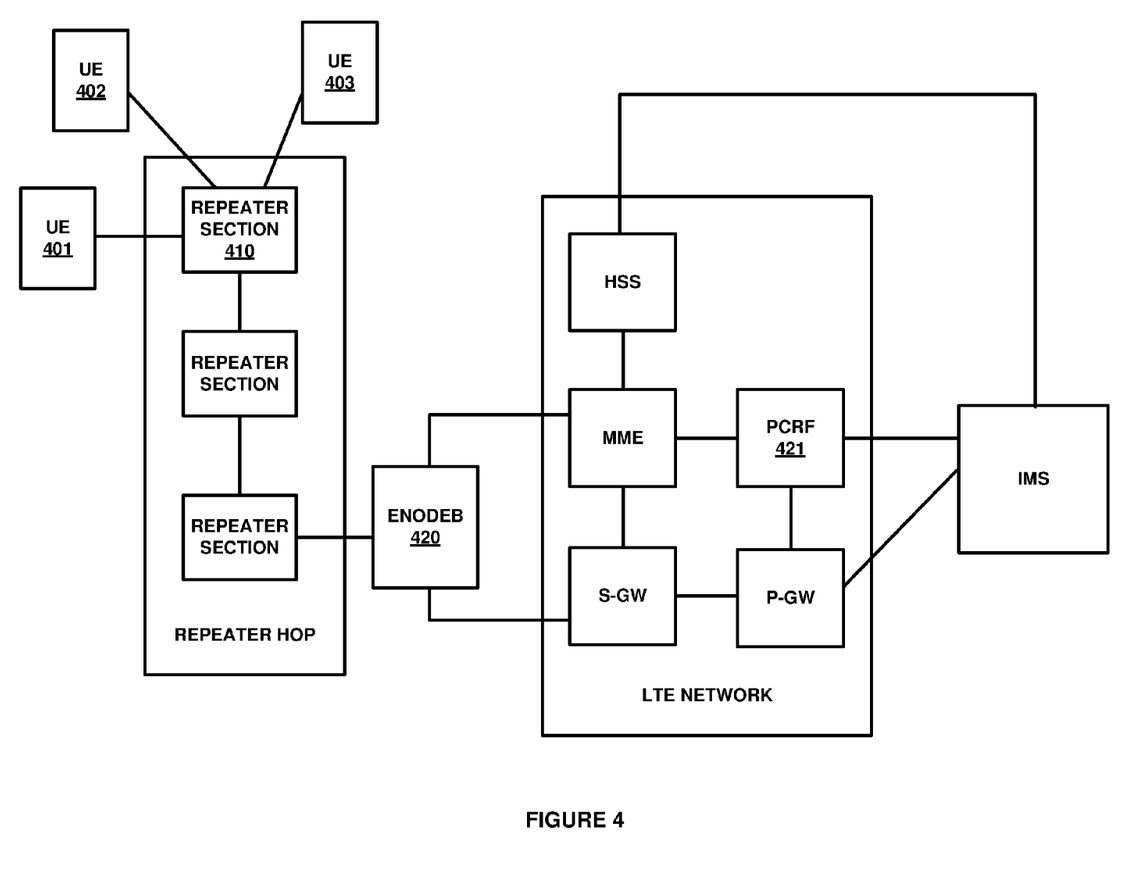
FIGS. 4-6 illustrate an LTE evolved NodeB (eNodeB) to dynamically control AGC in a repeater system serving individual UE.
Figure 5:
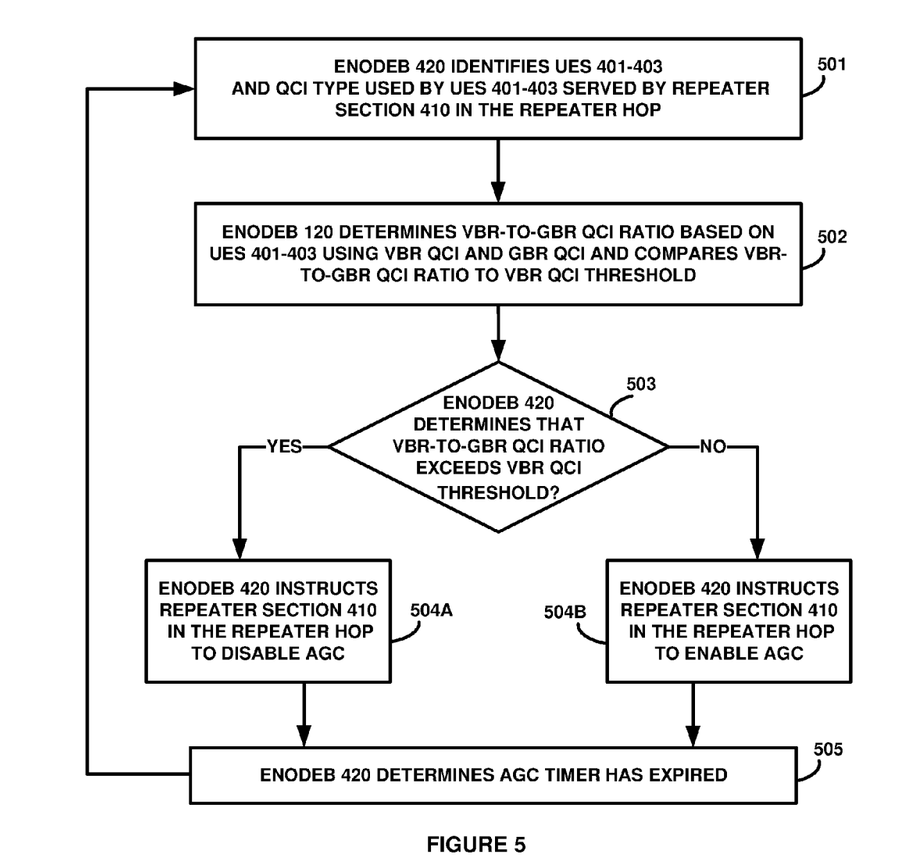
Figure 6:
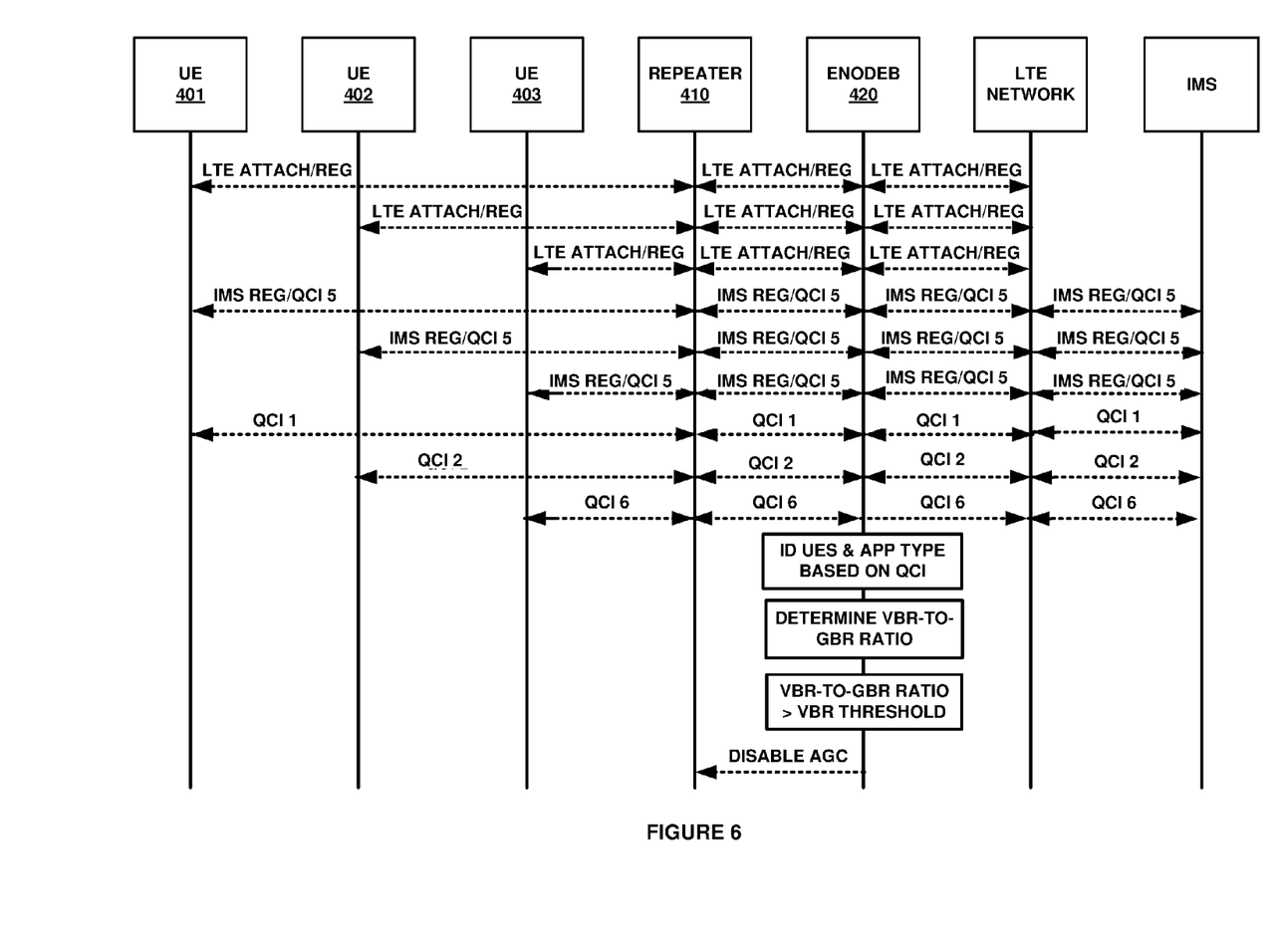

FIGS. 4-6 illustrate Long Term Evolution (LTE) communication system 400 to dynamically control AGC in a repeater system serving individual UEs. Referring to FIG. 4, LTE communication system 400 is an example of communication system 100, although communication system 100 may use alternative configurations and operations. LTE communication system 400 includes UEs 401-403, repeater section 410 in a repeater hop, LTE eNodeB 420, LTE network, and IMS. The LTE network includes a Serving Gateway (S-GW), a Mobility Management Entity (MME), a Home Subscriber Server (HSS), a Packet Data Network Gateway (P-GW), and a Policy Charging Rules Function (PCRF). IMS delivers IP multimedia services for UE 402 between the LTE network and external communication systems using IP signaling, such as Session Initiation Protocol (SIP). SIP is a popular form of signaling to control the exchange of IP packets between communication devices for media streaming and other data transfer services.

As shown in FIG. 4, UEs 401-403 exchange data and signaling with repeater section 410 over Radio Frequency (RF) links. Repeater section 410 and eNodeB 420 exchange data and signaling over an X2 interface communication link. eNodeB 420 communicates with the MME in the LTE network over a S1-MME signaling link. eNodeB 420 communicates with the S-GW in the LTE network over a S1-U data link. The MME and the HSS exchange data over a Diameter link. The S-GW and the P-GW communicate over an S5 or S8 data link. The P-GW and the PCRF exchange data over a Diameter link.

FIG. 5 illustrates a flow diagram of LTE communication system 400 to dynamically control AGC in a repeater system serving individual UEs. In operation, eNodeB 420 identifies (501) UEs 401-403 and an application type based on more or more QCI used by UEs 401-403 being served by repeater section 410 in the repeater hop. eNodeB 420 then determines (502) a VBR-to-GBR QCI ratio based on a number of UEs 401-403 using a VBR QCI and a number of UEs 401-403 using a GBR QCI. In response to determining the VBR-to-GBR QCI ratio, eNodeB 420 (503) compares the VBR-to-GBR QCI ratio to a VBR QCI threshold.

If eNodeB 420 determines that the VBR-to-GBR QCI ratio exceeds the VBR QCI threshold, then eNodeB 420 instructs (504A) repeater section 410 in the repeater hop to disable the AGC. If eNodeB 420 determines that the VBR-to-GBR QCI ratio does not exceed the VBR QCI threshold, then eNodeB 420 instructs (504A) repeater section 410 in the repeater hop to enable the AGC. In either scenario, eNodeB 420 then sets a pre-determined timer and initiates the operation to re-determine the VRB-to-GBR QCI ratio for the current UEs and QCI used by the current UEs being served by repeater section 410 in the repeater hop when the timer expires.

FIG. 6 illustrates an operation of LTE communication system 400 to dynamically control AGC in a repeater system serving individual UEs. In operation, UEs 401-403 first attach to the LTE Network by detecting repeater section 410 and responsively exchanging signaling with the LTE network over eNodeB 420 and repeater section 410 in the repeater hop. UEs 401-403 then register with the IMS over the LTE network, eNodeB 420, and repeater section 410. UEs 401-403, repeater 410, eNodeB 420, the LTE network, and the IMS then exchange messaging to establish default bearers, such as a QCI 5 for IMS signaling.

Still referring to FIG. 5, after establishing the default bearers, UEs 401-403 each establish additional bearers over repeater section 410, eNodeB 420, the LTE network, and IMS. In this example, UE 401 establishes a QCI 1 for a conversational voice call, UE 402 establishes a QCI 2 for a conversational video call, and UE 403 establishes a QCI 6 for data streaming.

eNodeB 420 identifies UEs 401-403 and the accepted QCIs for each of the identified UEs 401-403 being served by repeater section 410 in the repeater hop. eNodeB 420 then determines a VBR-to-GBR QCI ratio based on a number of UEs 401-403 using a VBR QCI, such as the QCI 6 used by UE 403, and a number of UEs 401-403 using a GBR QCI, such as the QCI 1 used by UE 401 and the QCI 2 used by UE 402. In response to determining the VBR-to-GBR QCI ratio, eNodeB 420 compares the VBR-to-GBR QCI ratio to a VBR QCI threshold and determines that the VBR-to-GBR QCI ratio exceeds the VBR QCI threshold. eNodeB 420 then instructs repeater section 410 in the repeater hop to disable the AGC.

Figure 7:
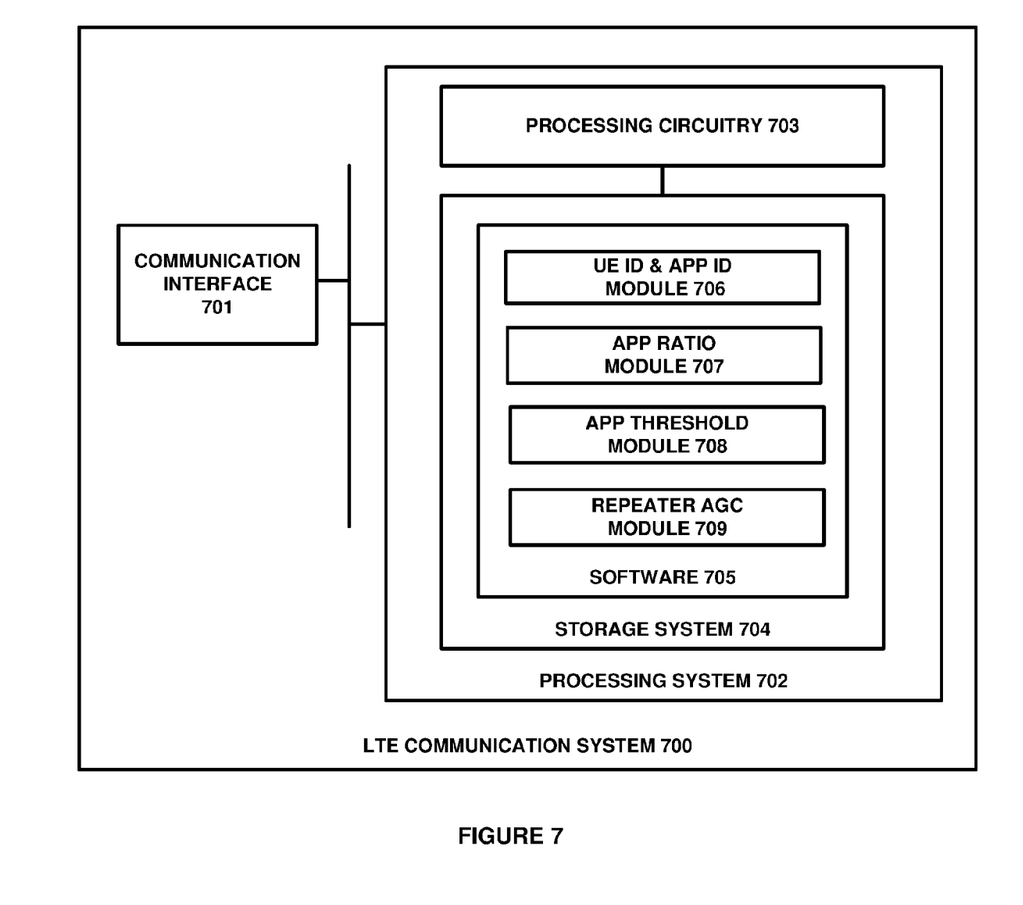
FIG. 7 illustrates an LTE communication system to dynamically control AGC in a repeater system serving individual UE.

FIG. 7 illustrates LTE communication system 700 to dynamically control AGC in a repeater system. LTE communication system 700 is an example of LTE communication system 120 and eNodeB 420, although LTE communication system 120 and LTE communication system 420 may use alternative configurations and operations. LTE communication system 700 includes communication interface 701 and data processing system 702. Data processing system 702 is linked to communication interface 701.

Communication interface 701 comprises communication components, such as antennas, ports, amplifiers, filters, modulators, signal processors, and the like. Communication interface 701 may be configured to communicate over metallic, wireless, optical links, or some other communication media material. Communication interface 701 may be configured to use Time Division Multiplex (TDM), Internet Protocol (IP), Ethernet, optical networking, wireless protocols, communication signaling, or some other communication format—including combinations thereof. In particular, communication interface 701 may be configured to exchange data with a repeater system to identify individual UEs and an application type used by the individual UEs being served by a repeater section in a repeater system. Communication interface 701 may further be configured to instruct a repeater section in a repeater system to disable the AGC.

Data processing system 702 includes processing circuitry 703 and storage system 704 that stores software 705. Processing circuitry 703 comprises a microprocessor and other circuitry that retrieves and executes software 705 from storage system 704. Storage system 704 comprises a non-transitory storage medium, such as a disk drive, flash drive, data storage circuitry, or some other memory apparatus. Software 705 comprises computer programs, firmware, or some other form of machine-readable processing instructions. Software 705 may further include an operating system, utilities, drivers, network interfaces, applications, or some other type of software. When executed by processing circuitry 703, software 705 directs processing system 702 to operate LTE communication system 700 as described herein.

In particular, when executed by processing circuitry 703, UE and Application Identifier module 706 directs processing circuitry 704 to identify individual UEs and an application type used by individual UEs being served by a repeater section in a repeater system. When executed by processing circuitry 703, application ratio module 707 directs processing circuitry 703 to determine a VBR-to-GBR application ratio based on a number of the identified individual UEs using a VBR application and a number of the identified individual UEs using a GBR application. When executed by processing circuitry 703, application threshold module 708 directs processing circuitry 703 to compare a VBR-to-GBR application ratio to a VBR application threshold and that the VBR-to-GBR application ratio exceeds the VBR application threshold. When executed by processing circuitry 703, repeater AGC module 709 directs processing circuitry 703 to instruct a repeater section in a repeater system to disable AGC for the repeater section.

Figure 8:
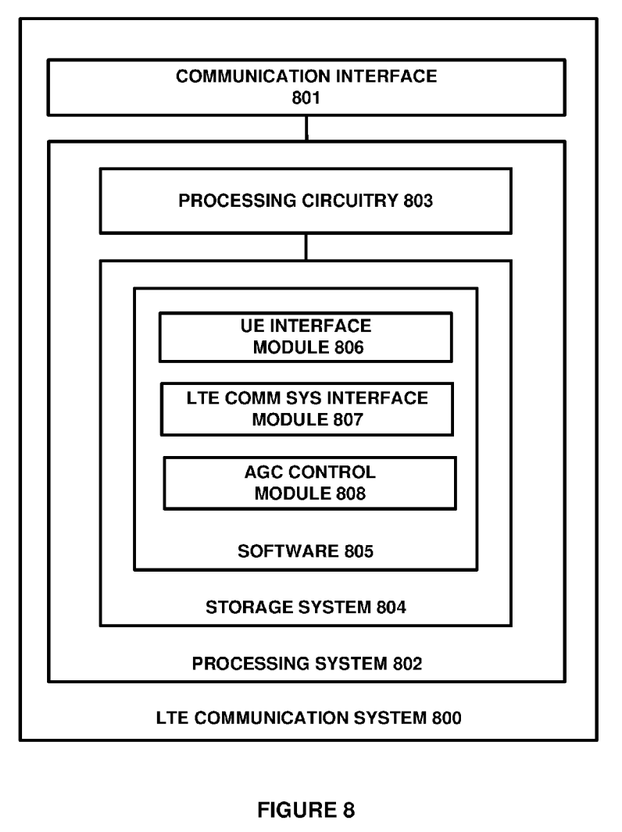
FIG. 8 illustrates a repeater section to dynamically disable AGC.

FIG. 8 illustrates a repeater section in a repeater system to disable AGC. Repeater section 800 is an example of repeater section 110 and repeater section 410, although repeater section 110 and repeater section 410 may use alternative configurations and operations. Repeater section 800 includes communication interface 801 and data processing system 802. Data processing system 802 is linked to communication interface 801.

Communication interface 801 comprises communication components, such as antennas, ports, amplifiers, filters, modulators, signal processors, and the like. Communication interface 801 may be configured to communicate over metallic, wireless, optical links, or some other communication media material. Communication interface 801 may be configured to use Time Division Multiplex (TDM), Internet Protocol (IP), Ethernet, optical networking, wireless protocols, communication signaling, or some other communication format—including combinations thereof. In particular, communication interface 801 may be configured to exchange data between a relay control system and a wireless relay.

Data processing system 802 includes processing circuitry 803 and storage system 804 that stores software 805. Processing circuitry 803 comprises a microprocessor and other circuitry that retrieves and executes software 805 from storage system 804. Storage system 804 comprises a non-transitory storage medium, such as a disk drive, flash drive, data storage circuitry, or some other memory apparatus. Software 805 comprises computer programs, firmware, or some other form of machine-readable processing instructions. Software 805 may further include an operating system, utilities, drivers, network interfaces, applications, or some other type of software. When executed by processing circuitry 803, software 805 directs processing system 802 to operate donor base station 800 as described herein.

In particular, when executed by processing circuitry 803, UE interface module 806 directs processing circuitry 804 to exchange data and signaling with UEs. When executed by processing circuitry 803, LTE communication system interface module 807 directs processing circuitry 803 to exchange data and signaling with an LTE communication system. When executed by processing circuitry 803, AGC control module 808 directs processing circuitry 803 to disable and enable AGC based on instructions delivered from an LTE communication system.

Referring back to FIG. 1, UEs 101-103 could be a phone, tablet computer, media device, or some other apparatus having a wireless LTE transceiver. UEs 101-103 includes processing circuitry and memory that store and execute various software modules. UEs 101-103 comprises communication transceivers, such as antennas, ports, bus interfaces, signal processors, memory, and software.

Repeater section 110 and LTE communication system 120 each may include communication interfaces, network interfaces, processing systems, computer systems, microprocessors, storage systems, storage media, or some other processing devices or software systems, and may be distributed among multiple devices. In particular, repeater section 110 and LTE communication system 120 may be configured to provide wireless coverage to one or more UEs. LTE communication system 120 is a control node within the wireless access network and is responsible for dynamically instructing a repeater section in a repeater system to disable or enable the AGC. LTE communication system 120 may be located in a core wireless access network, in a separate NFV containing other network elements, or distributed among multiple networks.

Wireless links 130-132 may use air, space, or some other wireless material that transports media. Wireless links 130-132 may use protocols, such as LTE, Code Division Multiple Access (CDMA), Orthogonal Frequency Division Multiplexing Access (OFDMA), LTE Wireless Aggregation (LWA), Internet Protocol (IP), or some other wireless communication format—including combinations thereof.

Communication links 133-134 may use metal, glass, optics, air, space, or some other material as the transport media. Communication links 133-134 may use Time Division Multiplexing (TDM), IP, Ethernet, Synchronous Optical Networking (SONET), communication signaling, wireless communications, or some other communication format—including improvements thereof. Communication links 133-134 may be a direct link, or can include intermediate networks, systems, or devices, and can include a logical network link transported over multiple physical links.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating a Long Term Evolution (LTE) communication system to dynamically control Automatic Gain Control (AGC) in a repeater system serving individual User Equipment (UE), the method comprising:
    identifying individual UEs served by a repeater section of the repeater system based on a location of the UEs within the repeater system and identifying one or more Quality-of-Service (QoS) Class Identifiers (QCIs) used by the individual UEs;
    determining a Variable Bit Rate (VBR)-to-Guaranteed Bit Rate (GBR) QCI ratio based on a number of VBR QCIs used by the identified individual UEs to a total number of GBR QCIs used by the identified individual UEs;
    comparing the VBR-to-GBR QCI ratio to a VBR QCI threshold and determining that the VBR-to-GBR QCI ratio exceeds the VBR QCI threshold;
    in response to determining that the VBR-to-GBR QCI ratio exceeds the VBR QCI threshold, instructing the repeater section in the repeater system to disable the AGC; and
    wherein the AGC is dynamically controlled based at least on one of a UE attachment, a QCI establishment, and a timer.

2. The method of claim 1 further comprising determining that the VBR-to-GBR QCI ratio does not exceed the VBR QCI threshold and in response, instructing the repeater section in the repeater system to enable the AGC.

3. The method of claim 1 further comprising setting a timer for a pre-determined period of time and re-determining the VBR-to-GBR QCI ratio in response to the timer expiring.

4. The method of claim 1 wherein determining a number of the identified individual UEs using a GBR QCI comprises determining a number of the identified individual UEs using a QCI Type 1 (QCI 1).

5. The method of claim 1 wherein the repeater section comprises a repeater hop containing one or more repeater sections in the repeater system.

6. The method of claim 1 wherein the LTE communication system comprises an evolved NodeB (eNodeB).

7. A Long Term Evolution (LTE) communication system to dynamically control Automatic Gain Control (AGC) in a repeater system serving individual User Equipment (UE), the LTE communication system comprising:
    a data processing system configured to identify individual UEs served by a repeater section of the repeater system based on a location of the UEs within the repeater system and identifying one or more Quality-of-Service (QoS) Class Identifiers (QCIs) used by the individual UEs;
    the data processing system configured to determine a Variable Bit Rate (VBR)-to-Guaranteed Bit Rate (GBR) QCI ratio based on a number of VBR QCIs used by the identified individual UEs to a total number of GBR QCIs used by the identified individual UEs;
    the data processing system configured to compare the VBR-to-GBR QCI ratio to a VBR QCI threshold and determine that the VBR-to-GBR QCI ratio exceeds the VBR QCI threshold;
    in response to determining that the VBR-to-GBR QCI ratio exceeds the VBR QCI threshold, the data processing system configured to instruct the repeater section in the repeater system to disable the AGC; and
    wherein the AGC is dynamically controlled based at least on one of a UE attachment, a QCI establishment, and a timer.

8. The LTE communication system of claim 7 further comprising the data processing system configured to determine that the VBR-to-GBR QCI ratio does not exceed the VBR QCI threshold and in response, instruct the repeater section in the repeater system to enable the AGC.

9. The LTE communication system of claim 7 further comprising the data processing system configured to set a timer for a pre-determined period of time and re-determine the VBR-to-GBR QCI ratio in response to the timer expiring.

10. The LTE communication system of claim 7 wherein the data processing system configured to determine a number of the identified individual UEs using a GBR QCI comprises the data processing system configured to determine a number of the identified individual UEs using a QCI Type 1 (QCI 1).

11. The LTE communication system of claim 7 wherein the repeater section comprises a repeater hop containing one or more repeater sections in the repeater system.

12. The LTE communication system of claim 7 wherein the LTE communication system comprises an evolved NodeB (eNodeB).

* * * * *